US012646245B2

(12) United States Patent
Lin et al.

(10) Patent No.: US 12,646,245 B2
(45) Date of Patent: Jun. 2, 2026

(54) IMAGE DISPLAY METHOD AND APPARATUS, DEVICE, AND MEDIUM

(71) Applicant: BEIJING ZITIAO NETWORK TECHNOLOGY CO., LTD., Beijing (CN)

(72) Inventors: Gaojie Lin, Beijing (CN); Yuxuan Luo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 212 days.

(21) Appl. No.: 18/264,886

(22) PCT Filed: Jan. 29, 2022

(86) PCT No.: PCT/CN2022/074871
§ 371 (c)(1),
(2) Date: Aug. 9, 2023

(87) PCT Pub. No.: WO2022/171020
PCT Pub. Date: Aug. 18, 2022

(65) Prior Publication Data
US 2024/0054719 A1 Feb. 15, 2024

(30) Foreign Application Priority Data

Feb. 10, 2021 (CN) .......................... 202110185451.7

(51) Int. Cl.
*G06T 15/40* (2011.01)
*G06T 7/10* (2017.01)
(Continued)

(52) U.S. Cl.
CPC ................ *G06T 15/40* (2013.01); *G06T 7/10* (2017.01); *G06T 7/50* (2017.01); *G06T 7/75* (2017.01);
(Continued)

(58) Field of Classification Search
CPC .. G06T 15/40; G06T 7/10; G06T 7/50; G06T 7/75; G06T 19/006; G06T 2207/20021; G06T 2207/30196; G06V 40/10
(Continued)

(56) References Cited

U.S. PATENT DOCUMENTS 9,165,318 B1 * 10/2015 Pauley ............... G06Q 30/0643
10,008,039 B1 * 6/2018 Neustein ............ G06Q 30/0643
(Continued)

FOREIGN PATENT DOCUMENTS

CN 109286835 A 1/2019
CN 110221690 A 9/2019
(Continued)

OTHER PUBLICATIONS

International Search Report (with English translation) and Written Opinion issued in PCT/CN2022/074871, dated Apr. 20, 2022, 11 pages provided.
(Continued)

*Primary Examiner* — Jin Ge
(74) *Attorney, Agent, or Firm* — Fish & Richardson P.C.

(57) ABSTRACT

An image display method, a device, and a medium. The image display method includes acquiring a real-time image of a target body part; and displaying a composite image in real time. The composite image is an image obtained by superposing a target three-dimensional image onto the target body part in the real-time image, the target three-dimensional image is obtained by rendering a wearable component three-dimensional model based on a real-time posture and a real-time unoccluded area of the target body part, and the real-time posture and the real-time unoccluded area are determined based on the real-time image.

18 Claims, 7 Drawing Sheets

(51) Int. Cl.

| | |
|---|---|
| *G06T 7/50* | (2017.01) |
| *G06T 7/73* | (2017.01) |
| *G06T 19/00* | (2011.01) |
| *G06V 40/10* | (2022.01) |

(52) U.S. Cl.
CPC ............ *G06T 19/006* (2013.01); *G06V 40/10* (2022.01); *G06T 2207/20021* (2013.01); *G06T 2207/30196* (2013.01)

(58) Field of Classification Search
USPC ......................................................... 345/421
See application file for complete search history.

(56) References Cited

U.S. PATENT DOCUMENTS

| | | | | |
|---|---|---|---|---|
| 10,789,778 | B1 * | 9/2020 | Li | G06V 20/20 |
| 10,976,829 | B1 * | 4/2021 | Viswanathan | G06N 20/00 |
| 2015/0260990 | A1 * | 9/2015 | Ueno | G09G 3/003 |
| | | | | 345/419 |

| | | | | |
|---|---|---|---|---|
| 2017/0316617 | A1 * | 11/2017 | Jeong | G06T 7/74 |
| 2019/0122404 | A1 * | 4/2019 | Freeman | G06V 40/161 |
| 2020/0013212 | A1 | 1/2020 | Wang et al. | |
| 2022/0075453 | A1 | 3/2022 | Huang | |

FOREIGN PATENT DOCUMENTS

| | | | | |
|---|---|---|---|---|
| CN | 111369686 | A | 7/2020 | |
| CN | 111754303 | A | 10/2020 | |
| CN | 112241999 | * | 10/2020 | G06T 17/00 |
| CN | 112241999 | A | 1/2021 | |
| CN | 112348841 | A | 2/2021 | |
| KR | 101710521 | B1 | 2/2017 | |
| WO | 2019019927 | A1 | 1/2019 | |

OTHER PUBLICATIONS

First Office Action for Chinese Application No. 202110185451.7, mailed Apr. 23, 2025, 17 pages.

* cited by examiner

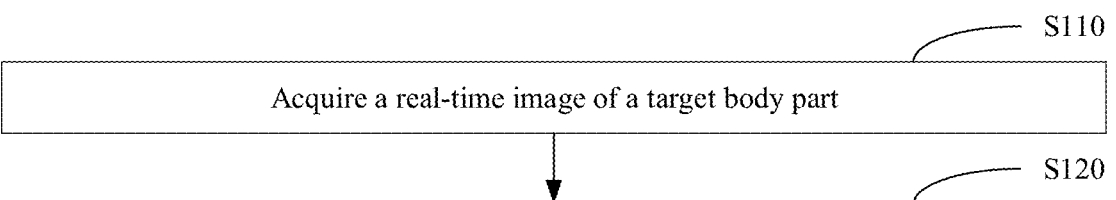

Acquire a real-time image of a target body part    S110

Display a composite image in real time, where the composite image is an image obtained by superposing a target three-dimensional image onto the target body part in the real-time image, the target three-dimensional image is obtained by rendering a wearable component three-dimensional model based on a real-time posture and a real-time unoccluded area of the target body part, and the real-time posture and the real-time unoccluded area are determined based on the real-time image    S120

Figure 1

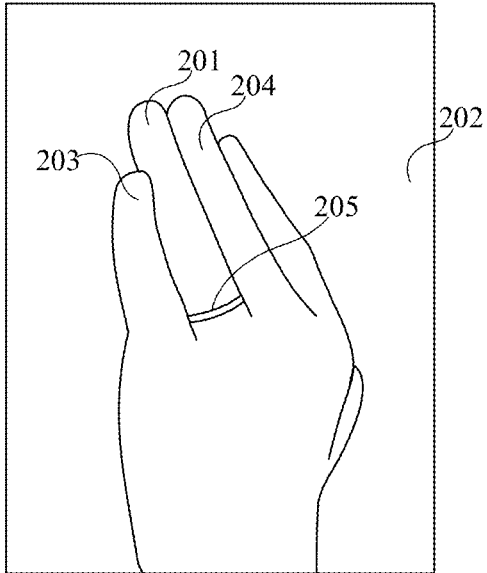

Figure 2

IMAGE DISPLAY METHOD AND APPARATUS, DEVICE, AND MEDIUM

This application is the national phase of International Patent Application No. PCT/CN2022/074871, filed on Jan. 29, 2022, which claims the priorities to Chinese Patent Application No. 202110185451.7, titled "IMAGE DISPLAY METHOD AND APPARATUS, DEVICE, AND MEDIUM", filed on Feb. 10, 2021 with the China National Intellectual Property Administration, both of which are incorporated herein by reference in their entireties.

TECHNICAL FIELD

The present disclosure relates to the field of multimedia technology, in particular to an image display method, apparatus, and device, and a medium.

BACKGROUND

With the rapid development of computer technology and mobile communication technology, various image capture platforms based on electronic devices have been widely used, greatly enriching people's daily lives. More and more users are willing to capture images on the image capture platforms to obtain satisfactory photos or videos.

In order to increase the fun of capturing images, decorative effects may be added to the images in real-time when the user is capturing images. However, although the conventional decorative effects are interesting, the fusion of the conventional decorative effects with the original images is poor, and goof occurs frequently, reducing the user experience.

SUMMARY

In order to solve the above technical problem or at least partially solve it, an image display method, apparatus, and device, and a medium are provided according to the present disclosure.

In the first aspect, an image display method is provided according to the present disclosure. The image display method includes:

acquiring a real-time image of a target body part;

displaying a composite image in real time, where the composite image is an image obtained by superposing a target three-dimensional image onto the target body part in the real-time image, the target three-dimensional image is obtained by rendering a wearable component three-dimensional model based on a real-time posture and a real-time unoccluded area of the target body part, and the real-time posture and the real-time unoccluded area are determined based on the real-time image.

In a second aspect, an image display apparatus is provided according to the present disclosure. The image display apparatus includes:

acquisition unit, configured to acquire a real-time image of a target body part; and display unit, configured to display a composite image in real-time, where the composite image is an image obtained by superposing a target three-dimensional image onto the target body part in the real-time image, the target three-dimensional image is obtained by rendering a wearable component three-dimensional model based on a real-time posture and a real-time unoccluded area of the target body part, and the real-time posture and the real-time unoccluded area are determined based on the real-time image.

In a third aspect, an image display device is provided according to the present disclosure. The image display device includes:

processor; and memory for storing executable instructions; and where, the processor is configured to read executable instructions from memory and execute executable instructions to implement the image display method described in the first aspect.

In a fourth aspect, a computer-readable storage medium storing a computer program is provided according to the present disclosure. The computer program, when executed by the processor, causes the processor to perform the image display method described in the first aspect.

The technical solution provided according to the embodiments of the present disclosure has the following advantages compared to the prior art.

With the image display method, apparatus, and device, and the medium according to the embodiments of the present disclosure, after the real-time image of the target body part is acquired, a composite image obtained by superposing the target three-dimensional image onto the target body part in the real-time image is displayed in real time, where the target three-dimensional image is obtained by rendering the wearable component three-dimensional model based on the real-time posture and the real-time unoccluded area of the target body part, and the real-time posture and the real-time unoccluded area are directly determined based on the real-time image. Therefore, the goal of automatically adding the three-dimensional decorative effect with wearable components to the real-time image is achieved. By considering the posture and occlusion state of the body part on which the decorations are wore in the process of adding the three-dimensional decorative effect, the fusion of the added three-dimensional decorative effect with the original image can be improved and the occurrence of goofs can be avoid, thereby improving the user experience.

BRIEF DESCRIPTION OF THE DRAWINGS

The above and other features, advantages and aspects of the embodiments of the present disclosure will be more apparent with reference to the following embodiments in conjunction with the drawings. The same or similar reference numerals throughout the drawings represent the same or similar elements. It should be understood that the drawings are schematic and the components and elements are unnecessarily drawn to scale.

FIG. 1 is a schematic flowchart of an image display method according to an embodiment of the present disclosure;

FIG. 2 is a schematic diagram of a composite image according to an embodiment of the present disclosure;

DETAILED DESCRIPTION OF THE EMBODIMENTS

Figure 3:
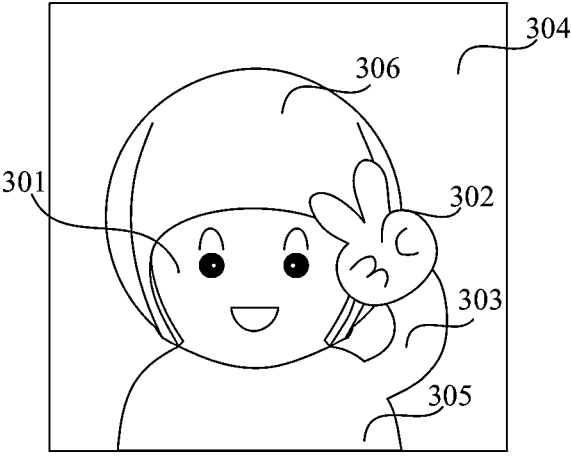
FIG. 3 is a schematic diagram of a composite image according to another embodiment of the present disclosure.

The embodiments of the present disclosure are described in detail below with reference to the accompanying drawings. Although the drawings show some embodiments of the present disclosure, it should be understood that the present disclosure can be implemented in various forms and is not limited to the embodiments described herein. The embodiments are provided for a more thorough and complete understanding of the present disclosure. It should be understood that the drawings and the embodiments in the present disclosure are only for illustrative purpose, and are not intended to limit the protection scope of the present disclosure.

It should be understood that the steps of the method according to the embodiments of the present disclosure may be performed in different orders, and/or be performed in parallel. In addition, the method embodiments may include an additional step and/or omit to perform the illustrated steps. The scope of the present disclosure is not limited in this regard.

The term "including" and variants thereof as used herein are open-ended includes, that is, "including but not limited to". The term "based on" means "based at least in part on." The term "an embodiment" means "at least one embodiment", the term "another embodiment" means "at least one another embodiment", and the term "some embodiments" means "at least some embodiments". Definitions of other terms are provided in the following description.

It should be noted that the wordings such as "first" and "second" mentioned in the present disclosure are used to distinguish different apparatus, modules or units, and are not used to limit an sequential order or interdependence of the functions performed by the apparatus, modules or units.

It should be noted that, the wordings such as "one" and "multiple" mentioned in the present disclosure are schematic rather than restrictive, and should be understood as "one or more" by those skilled in the art, otherwise explicitly illustrated in the context.

The names of messages or information exchanged between multiple apparatuses in the embodiments of the present disclosure are only for illustrative purposes, and are not intended to limit the scope of the messages or information.

Augmented Reality (AR) technology is a technology that can calculate position and angle of a camera in real-time and add an image, a video, or a three-dimensional model thereto. This technology can combine the virtual word with the real world on a screen and enable interaction thereon.

With the development of computer technology, the AR technology has been more widely applied and is gradually applied to the capturing function of image capturing platforms. In order to increase the fun of capturing images, when a user is capturing images, decorative effects may be added to user body parts in the images in real-time using the AR technology. For example, a helmet effect is added to the user's head, and a watch effect is added to the user's wrist.

However, the applicant found that although the conventional decorative effects are somewhat interesting, they still have the following problems.

The decorative effect is prone to cover the entire body part. In a case that there is another object occluding on that body part, the decorative effect also covers the occluding object. For example, when adding a helmet effect to user's head, in a case that the head position to which the helmet effect is to be added is occluded by user's hand, the helmet effect also covers the user's hand. This can lead to poor fusion between the decorative effect and the original image, often resulting in goofs, so that the users can hardly achieve immersive feelings during the use of decorative effects and thus the user experience is reduced.

In addition, when adding a decorative effect to users' fingers, since the occlusion relationship between fingers is more complex and is difficult to simulate as compared to the head, wrist, etc., the fusion between the decorative effect and the original image becomes worse. For example, in the process of trying on an AR ring by a user, it is more likely to have poor ring fitting or occurrence of goofs of the ring embedding into an adjacent finger and the like.

In order to address the above problems, an image display method, apparatus, and device, and a medium capable of considering the posture and occlusion state of the body parts on which the decorations are to be worn when adding decorative effects are provided according to the embodiments of the present disclosure.

The image display method according to the embodiments of the present disclosure is explained first with reference to FIG. 1.

In the embodiments of the present disclosure, the image display method may be executed by an electronic device. The electronic device may include a device with communication function such as a mobile phone, a tablet computer, a desktop computer, a notebook computer, an in-vehicle terminal, a wearable electronic device, an all-in-one machine, and a smart home device, or may be a device simulated with a virtual machine or an emulator.

FIG. 1 shows a schematic flowchart of an image display method according to an embodiment of the present disclosure.

As shown in FIG. 1, the image display method includes the following steps.

In S110, a real-time image of a target body part is acquired.

In the embodiment of the present disclosure, when a user wants to add a decorative effect to a target body part in a real-time image, the user may acquire the real-time image of the target body part using the electronic device.

In some embodiments, the electronic device may capture an image through a camera to acquire the real-time image of the target body part.

In other embodiments, the electronic device may receive an image sent by other devices to acquire the real-time image of the target body part.

In some other embodiments, the electronic device may locally read an image selected by a user from local images to acquire the real-time image of the target body part.

After the electronic device acquires the real-time image of the target body part, the electronic device can add a decorative effect to the target body part in the real-time image.

The target body part may be any body part of a human body that is preset according to practical application needs, and is not limited here. For example, the target body part may include a body part of a first granularity, such as, any one of a head, a torso, upper limbs, hands, lower limbs, and feet. For another example, the target body part may include a body part of a second granularity finer than the first granularity, such as, any one of ears, a neck, wrists, fingers, ankles.

Furthermore, the number of the target body parts may be any number preset according to actual application needs, and is not limited here. For example, the number of the target body parts may be 1, 2, 3, etc.

In S120, a composite image is displayed in real time. The composite image is an image obtained by superposing a target three-dimensional image onto the target body part in the real-time image. The target three-dimensional image is obtained by rendering a wearable component three-dimensional model based on a real-time posture and a real-time unoccluded area of the target body part. The real-time posture and the real-time unoccluded area are determined based on the real-time image.

In the embodiment of the present disclosure, after acquiring the real-time image of the target body part, the electronic device can add a decorative effect to the target body part in the real-time image in real time, and display in real time a composite image obtained by superposing a target three-dimensional image corresponding to a three-dimensional decorative effect onto the target body part in the real-time image.

In the embodiment of the present disclosure, the electronic device determines the real-time posture of the target body part based on the real-time image.

Optionally, the real-time posture may be a real-time three-dimensional posture of the target body part. The real-time posture may include a real-time rotational posture of the target body part.

Furthermore, the real-time rotational posture of the target body part may include a real-time three-dimensional rotational posture of each joint of the target body part.

In the embodiment of the present disclosure, the electronic device determines a real-time unoccluded area of the target body part based on the real-time image.

Optionally, the real-time unoccluded area may include an area of the target body part not occluded by an occluding object. The occluding object may include at least one of a non-body part object, a non-target body structure other than a target body structure to which the target body part belongs, and a non-target body part of the same body part type as the target body part, which may be preset according to actual application needs.

The non-body part object may include at least one of an image background of the real-time image and an object other than a human body that occludes any area of the target body part.

The target body structure may be a body structure to which the target body part belongs, and may be preset according to practical application needs, which is not limited here. For example, in a case that the target body part is a body part of the second granularity, the target body structure may be a body part of the first granularity, such as at least one of a head, a trunk, upper limbs, hands, lower limbs, and feet.

Furthermore, the target body part may be the target body structure itself, or may be a portion of the target body structure, which is not limited here.

The non-target body structure may be any body structure other than the target body structure among body structures divided with the granularity of the target body structure, which is not limited here.

For example, in a case that the target body structure is a hand, the non-target body structure may be a head, a torso, upper limbs, lower limbs, and feet.

The non-target body part may be any body part other than the target body part among body parts divided with the granularity of the target body part, which is not limited here.

For example, in a case that the target body part is a finger, the non-target body part may be other fingers.

Therefore, in the embodiment of the present disclosure, the electronic device may obtain a target three-dimensional image by rendering a wearable component three-dimensional model based on the real-time posture and the real-time unoccluded area of the target body part, and then superpose the target three-dimensional image onto the target body part in the real-time image to obtain a composite image.

Furthermore, the electronic device may render the wearable component three-dimensional model based on the real-time unoccluded area of the target body part according to the real-time posture of the target body part, to obtain a target three-dimensional image.

Furthermore, the electronic device may superpose the target three-dimensional image onto a wearable component wearing position of the target body part in the real-time image to obtain a composite image.

The wearable component wearing position may be any position on the target body part preset according to actual application needs, and is not limited here.

In some embodiments of the present disclosure, the target body part may include a target finger.

The target finger may be a finger preset according to actual application needs, and is not limited here. For example, the target finger may be at least one of the thumb, index finger, middle finger, ring finger, and little finger.

Correspondingly, the wearable component three-dimensional model may be a three-dimensional model of a component configured to be worn on the target finger. That is, the wearable component three-dimensional model is the three-dimensional model of the wearable component configured to be worn on the target finger.

In these embodiments, the real-time unoccluded area may include an area of the target finger in the real-time image that is not occluded by an occluding object.

Optionally, in order to consider all possible cases of the target finger being occluded, the occluding object may be set to include a non-body part object, a body structure other than the hand to which the target finger belongs, and fingers other than the target finger.

The non-body part object may include at least one of an image background and an object other than a human body that occludes any part area of the target finger.

The target finger is the body part of the second granularity, and the target body structure corresponding to the target finger is the body part of the first granularity. Therefore, the target body structure to which the target finger belongs is the hand to which the target finger belongs. In this case, the non-target hand body structure may be any body structure other than the hand to which the target finger belongs among the body structures divided according to the first granularity.

The non-target body part with the same body part type as the target finger may be any finger other than the target finger.

In some embodiments, the wearable component may be a component fittingly worn on the target finger, such as a ring.

In these embodiments, optionally, the electronic device may render a portion of the wearable component three-dimensional model within the real-time unoccluded area of the target finger according to the real-time posture, such as a real-time rotational posture, of the target finger, to obtain a target three-dimensional image, and then superpose the target three-dimensional image onto the wearable component wearing position of the target finger in the real-time image to obtain a composite image.

FIG. 2 shows a schematic diagram of a composite image according to an embodiment of the present disclosure.

As shown in FIG. 2, the composite image may be an image including a ring finger 201. The wearable component may be a ring 205. The entire boundary of the hand to which the ring finger 201 belongs is connected to an image background 202. Some areas of the ring finger 201 are occluded by a little thumb 203 and a middle finger 204. Therefore, the image background 202, the little thumb 203, and the middle finger 204 may all be considered as occluding objects for the ring finger 201. When rendering the ring three-dimensional model, the portion of the ring three-dimensional model within the unoccluded area of the ring finger 201 not occluded by the above occluding objects is rendered according to the real-time posture of the ring finger 201, to obtain the three-dimensional ring 205, and the ring 205 is superposed and displayed onto the ring wearing position of ring finger 201.

In other embodiments, the wearable component may be a component at least partially non-fittingly worn on the target finger, such as a nail enhancement.

In these embodiments, optionally, the wearable component three-dimensional model includes a first model portion corresponding to a fitting portion that fits the target finger and a second model portion corresponding to a non-fitting portion that does not fit the target finger. The electronic device may render, according to the real-time posture such as the real-time rotational posture of the target finger, a portion of the first model portion of the wearable component three-dimensional model within the real-time unoccluded area of the target finger and a portion of the second model portion within the real-time unoccluded background area of the real-time image to obtain a target three-dimensional image, and then superpose the target three-dimensional image onto the wearable component wearing position of the target finger in the real-time image to obtain a composite image.

The real-time unoccluded background area may include an image background of the real-time image and an image area of the real-time image corresponding to the body structure not connected to the non-target body structure among the occluding object.

Therefore, in these embodiments, the posture and occlusion state of the finger may be considered when adding a finger decoration effect, and then the finger decoration effect is added to the unoccluded area of the finger.

In other embodiments of the present disclosure, the target body part may include a target head.

Correspondingly, the wearable component three-dimensional model may be a three-dimensional model of a component configured to be worn on the target head. That is, the wearable component three-dimensional model is the three-dimensional model of the wearable component configured to be worn on the target head.

In these embodiments, the real-time unoccluded area may include an area of the target head in the real-time image that is not occluded by an occluding object.

Optionally, in order to consider all possible cases of the target head being occluded, the occluding object may be set to include a non-body part object and a non-target head body structure other than the target head.

The non-body part object may include at least one of an image background of the real-time image and an object other than a human body that occludes any part area of the target head.

The non-target head body structure may be any body structure other than the target head among the body structures divided according to the first granularity.

In some embodiments, the wearable component may be a component fittingly worn on the target head, such as a headband.

In these embodiments, optionally, the electronic device may render a portion of wearable component three-dimensional model within the real-time unoccluded area of the target head according to the real-time posture such as real-time rotational posture of the target head, to obtain a target three-dimensional image, and then superpose the target three-dimensional image onto the wearable component wearing position of the target head in the real-time image to obtain a composite image.

In other embodiments, the wearable component may be a component of which all portions are non-fittingly worn on the target head, such as a helmet.

In these embodiments, optionally, the electronic device may render, according to the real-time posture such as the real-time rotational posture of the target head, a portion of the wearable component three-dimensional model within the real-time unoccluded area of the target head and a portion of the wearable component three-dimensional model within the real-time unoccluded background area of the real-time image to obtain a target three-dimensional image, and then superpose the target three-dimensional image onto the wearable component wearing position of the target head in the real-time image to obtain a composite image.

The real-time unoccluded background area may include an image background of the real-time image and an image area of the real-time image corresponding to the body structure not connected to the non-target body structure among the occluding object.

FIG. 3 shows a schematic diagram of a composite image according to another embodiment of the present disclosure.

As shown in FIG. 3, the composite image may be an image including a target head 301. The wearable component may be a helmet 306. A partial area of the target head 301 is occluded by a hand 302. The hand 302 is connected to an upper limb 303. Therefore, when rendering a helmet three-dimensional model, a portion of the helmet three-dimensional model within the unoccluded area of the target head 301 not unoccluded by the hand 302, a portion of the helmet three-dimensional model within the image background 304, and a portion of the helmet three-dimensional model within a body 305 are rendered according to the real-time posture of the target head 301, to obtain a three-dimensional helmet 306, and the helmet 306 is superposed and displayed onto a helmet wearing position of the target head 301. The image background 304 and an image area corresponding to the body 305 form an unoccluded background area.

Therefore, in these embodiments, the posture and occlusion state of the head are considered when adding a head decorative effect, and then the head decorative effect is added to the unoccluded area of the head.

In the embodiments of the present disclosure, after the real-time image of the target body part is acquired, a composite image obtained by superposing the target three-dimensional image onto the target body part in the real-time image is displayed in real time. The target three-dimensional image is obtained by rendering the wearable component three-dimensional model based on the real-time posture and the real-time unoccluded area of the target body part. The real-time posture and the real-time unoccluded area are directly determined based on the real-time image. Therefore, the goal of automatically adding the three-dimensional decorative effect with wearable component to the real-time image is achieved. By considering the posture and occlusion state of the body part on which the decorations are worn in the process of adding the three-dimensional decorative effect, the fusion of the added three-dimensional decorative effect with the original image can be improved and the occurrence of goofs can be avoid, thereby improving the user experience.

In another embodiment of the present disclosure, in order to enable the electronic device to reliably display the composite image, the target three-dimensional image is obtained by rendering, based on the real-time posture and the real-time unoccluded area, a portion of the wearable component three-dimensional model not occluded by a preset body part model. The preset body part model may be used to simulate the target body part.

Optionally, prior to S120 shown in FIG. 1, the image display method may further include:

determining first depth information of the wearable component three-dimensional model and second depth information of the preset body part model according to the real-time posture;

determining a to-be-rendered portion of the wearable component three-dimensional model based on the real-time unoccluded area;

rendering, based on the first depth information and the second depth information, a portion of the to-be-rendered portion with a depth less than that of the preset body part model, to obtain the target three-dimensional image.

In the embodiment of the present disclosure, the electronic device acquires the real-time posture of the target body part, determines, according to the real-time posture, the first depth information of the wearable component three-dimensional model and the second depth information of the preset body part model, determines a to-be-rendered portion of the wearable component three-dimensional model based on the real-time unoccluded area, and renders, based on the first depth information and the second depth information, a portion of the to-be-rendered portion with a depth less than that of the preset body part model, to obtain the target three-dimensional image.

The real-time posture may include the real-time rotational posture of the target body part. The real-time rotational posture of the target body part may include real-time three-dimensional rotational posture of each joint of the target body part.

Furthermore, the real-time posture is represented by real-time three-dimensional rotational posture information of each joint of the target body part. The real-time three-dimensional rotational posture information may include Euler angle or rotation matrix, etc., which is not limited here.

For example, the three-dimensional posture representation of a human hand represents the three-dimensional rotational information of joints of human finger, and takes a form of Euler angles (i.e. respective rotation angles of a finger joint rotating around three axes of three-dimensional space) or rotation matrixes.

Optionally, before determining the depth information of the wearable component three-dimensional model according to the real-time posture, the image display method may further include performing posture detection on the target body part in the real-time image using a pre-trained three-dimensional posture detection model, to obtain the real-time posture of the target body part.

Therefore, in the embodiment of the present disclosure, the electronic device first performs posture detection on the target body part in the real-time image, to obtain the real-time posture of the target body part, and then determines the first depth information of the wearable component three-dimensional model and the second depth information of the preset body part model according to the real-time posture of the target body part.

In some embodiments, the electronic device may synchronously rotate the wearable component three-dimensional model and the preset body part model according to the real-time posture of the target body part, to make the model postures of the wearable component three-dimensional model and the preset body part model consistent with the real-time posture of the target body part, and then extract the first depth information of the wearable component three-dimensional model in such model posture and the second depth information of the preset body part model in such model posture.

In other embodiments, the electronic device may first perform feature point detection on the target body structure to which the target body part in the real-time image belongs using a pre-trained feature point detection model to obtain various feature points of the target body structure, and then synchronously scale, rotate, and translate the wearable component three-dimensional model and the preset body part model based on the real-time posture of the target body part and various feature points of the target body part, to make the model postures of the wearable component three-dimensional model and the preset body part model consistent with the real-time posture, real-time size, and real-time position of the target body part, and then extract the first depth information of the wearable component three-dimensional model and the second depth information of the preset body part model.

In an example, taking the case where the wearable component three-dimensional model is a ring three-dimensional model and the target body part is the ring finger as an example, the specific method for scaling, rotating, and translating the wearable component three-dimensional model may be as follows.

The electronic device generates a three-dimensional rotation matrix $M_{ring} \in R^{3\times3}$ of the ring three-dimensional model according to the real-time posture of the hand to which the ring finger belongs. The three-dimensional rotation matrix $M_{ring} \in R^{3\times3}$ of the ring three-dimensional model may be obtained by premultiplying the three-dimensional rotation matrix $M_{wrist}$ of the wrist joint by the three-dimensional rotation matrix $M_{finger}$ of the ring finger joint, that is, $M_{ring} = M_{wrist} M_{finger}$.

After setting the camera internal parameters of the electronic device such as Field of View (FOV), the size scale of the hand in the real-time image is estimated by calculating the length of feature point pairs, a depth of a three-dimensional position of the ring three-dimensional model is calculated based on the scale, and the approximate three-dimensional position of the ring three-dimensional model in a camera coordinate system, that is, the translation vector $V_{ring} \in R^{3 \times 1}$ of the ring three-dimensional model, is then calculated using the depth of the ring three-dimensional model and the pixel coordinates of key points of the ring finger.

Then, the three-dimensional rotation matrix $M_{ring} \in R^{3 \times 3}$ and the translation vector $R_{ring} \in R^{3 \times 1}$ are spliced to obtain a three-dimensional rotation and translation matrix $\overline{M}_{ring} \in R^{3 \times 4}$ of the ring three-dimensional model, that is, $\overline{M}_{ring} = M_{ring} | V_{ring}$.

Therefore, pixels of the ring three-dimensional model are rotated and translated according to the three-dimensional rotation and translation matrix $\overline{M}_{ring} \in R^{3 \times 4}$ of the ring three-dimensional model to obtain the ring three-dimensional model in a state that is consistent with the real-time posture, real-time size, and real-time position of the target body part.

In some embodiments of the present disclosure, the real-time unoccluded area may include an area of the target body part not occluded by an occluding object. The occluding object may include a non-target body structure other than the target body structure to which the target body part belongs.

In these embodiments, the determining, by the electronic device, the to-be-rendered portion of the wearable component three-dimensional model based on the real-time unoccluded area includes: first, performing image segmentation on the real-time image for the body structures to obtain a target body structure image, a non-target body structure image, and a background image, and determining, in the target body structure image, the real-time unoccluded area of the target body part. Therefore, the electronic device may determine the to-be-rendered portion of the wearable component three-dimensional model based on the target body structure image.

In a case that the wearable component is a component fittingly worn on the target body part, after obtaining the target body structure image, the electronic device determines a portion of the wearable component three-dimensional model within the real-time unoccluded area of the target body structure image as the to-be-rendered portion.

In a case that the wearable component is a component at least partially non-fittingly worn on the target body part, the wearable component three-dimensional model may include a first model portion corresponding to a fitting portion fitting the target body part and a second model portion corresponding to a non-fitting portion not fitting the target body part. After obtaining the target body structure image, the non-target body structure image and the background image, the electronic device may determine a portion of the first model portion within the real-time unoccluded area of the target finger and a portion of the second model portion within a real-time unoccluded background area of the real-time image as the to-be-rendered portion.

The real-time unoccluded background area may include an area corresponding to the background image and an area corresponding to the non-target body structure image that is not connected to the non-target body structure among the occluding object.

In a case that the wearable component is a component of which all portions are non-fittingly worn on the target head, after obtaining the target body structure image, the non-target body structure image, and the background image, the electronic device may determine a portion of the wearable component three-dimensional model within the real-time unoccluded area of the target finger and a portion of the wearable component three-dimensional model within the real-time unoccluded background area of the real-time image as the to-be-rendered portion.

The real-time unoccluded background area may include an area corresponding to the background image and an area corresponding to the non-target body structure image that is not connected to the non-target body structure among the occluding object.

Figure 4:
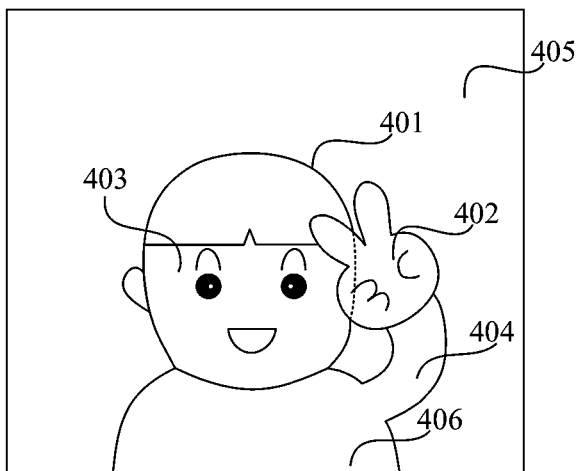
FIG. 4 is a schematic diagram of a renderable image area according to an embodiment of the present disclosure.

FIG. 4 shows a schematic diagram of a renderable image area according to an embodiment of the present disclosure.

As shown in FIG. 4, a target head 401 is occluded by a hand 402. Therefore, an area of the target head 401 not occluded by the hand 402 is a real-time unoccluded area 403 (an area of the target head 401 other than the shaded portion). The hand 402 is connected to an upper limb 404. The real-time unoccluded background area may include an area corresponding to the image background 405 and a body 406. Therefore, in a case that the wearable component is a helmet, since the helmet is to be non-fittingly worn on the target head 401, the real-time unoccluded area 403 and the real-time unoccluded background area may form a renderable image area. The to-be-rendered portion of the helmet three-dimensional model may include a portion of the helmet three-dimensional model within the renderable image area.

Therefore, the electronic device may simulate the occlusion of the non-target body structure to the three-dimensional decorative effect, in a case that the occluding object includes the non-target body structure other than the target body structure to which the target body part belongs, in order to improve the fusion of the added three-dimensional decorative effect with the original image.

In other embodiments of the present disclosure, the real-time unoccluded area may include an area of the target body part not occluded by an occluding object. The occluding object may include at least one of a non-body part object and a non-target body structure other than the target body structure to which the target body part belongs.

Correspondingly, determining the to-be-rendered portion of the wearable component three-dimensional model based on the real-time unoccluded area may include:

performing image segmentation on the real-time image for the target body structure to which the target body part belongs, to obtain a target body structure image;

determining, in the target body structure image, the real-time unoccluded area; and determining the to-be-rendered portion based on the real-time unoccluded area.

In these embodiments, the electronic device may perform image segmentation on the real-time image for the target body structure to which the target body part belongs, to obtain the target body structure image, and determine an area of the target body part within the target body structure image as the real-time unoccluded area, and determine, based on the real-time unoccluded area, the to-be-rendered portion of the wearable component three-dimensional model.

In a case that the wearable component is a component configured to be fittingly worn on the target body part, after obtaining the target body structure image, the electronic device may determine a portion of the wearable component three-dimensional model within the real-time unoccluded area of the target body structure image as the to-be-rendered portion.

Figure 5:
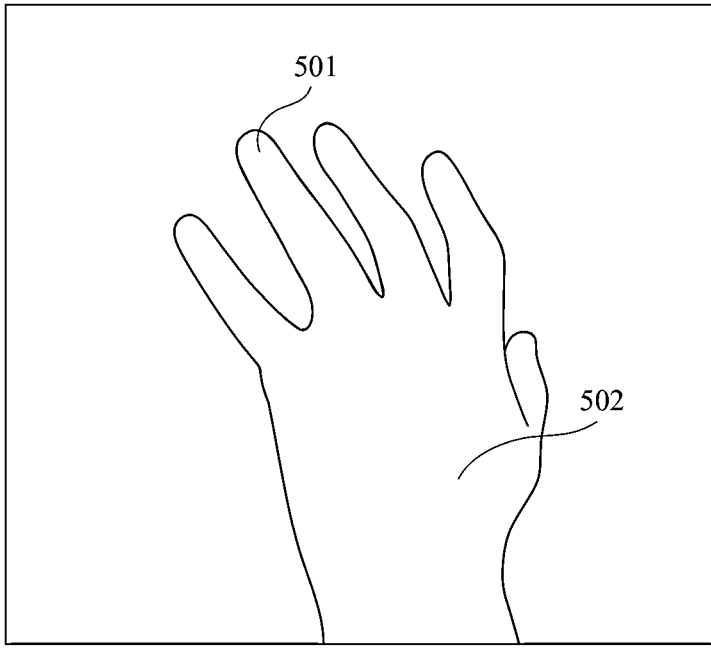
FIG. 5 is a schematic diagram of a renderable image area according to another embodiment of the present disclosure.

FIG. 5 shows a schematic diagram of a renderable image area according to another embodiment of the present disclosure.

As shown in FIG. 5, neither ring finger 501 nor hand 502 are occluded by other body structures or fingers. Therefore, the entire area of ring finger 501 of hand 502 is the real-time unoccluded area. In a case that the wearable component is a ring, since the ring is configured to be fully fittingly worn on the ring finger 501, the real-time unoccluded area may form a renderable image area. The to-be-rendered portion of the ring three-dimensional model may include a portion of the ring three-dimensional model within the renderable image area, leaving the background area of the wearable component outside the hand 502 not rendered. As a non-hand area, the background area may be obtained by cutting out the hand image.

In the embodiment of the present disclosure, in a case that the wearable component is a component except for the component fittingly worn on the target body part, the method for determining the to-be-rendered portion is similar to the method in the embodiment where the occluding object includes a non-target body structure, and will not be further described here.

Therefore, the electronic device simulates the occlusion state of a non-body part object and a non-target body structure to three-dimensional decorative effect in a case that the occluding object includes at least one of the non-body part object and the non-target body structure, improving the fusion of the added three-dimensional decorative effect with the original image.

In still other embodiments of the present disclosure, the occluding object may include the non-body part object and the non-target body structure other than the target body structure to which the target body part belongs, and may also include the non-target body part with the same body part type as the target body part, as shown in FIG. 2.

Correspondingly, determining, in the target body structure image, the real-time unoccluded area may specifically include:

performing, on the target body structure image, feature point detection with regard to the target body structure to obtain the feature points of the target body structure;

determining, based on feature points, an occluded area where the non-target body part occludes the target body part.

determining, based on the occluded area, the real-time unoccluded area in the target body structure image.

In these embodiments, the electronic device may first perform the feature point detection on the target body structure image in the real-time image using the pre-trained feature point detection model, to obtain various feature points of the target body structure, and then determine an occluded area where the non-target body part occludes the target body part based on the feature points of the non-target body part and the target body part, and then determine a real-time unoccluded area in the target body structure image based on the occluded area to determine the to-be-rendered portion.

Specifically, the electronic device may first determine, among the feature points corresponding to the target body part, a first feature point and a second feature point closest to the wearable component wearing position; then determine, among all feature points corresponding to the non-target body part, a third feature point and a fourth feature point closest to the first feature point, as well as a fifth feature point and a sixth feature point closest to the second feature point; calculate a first midpoint between the first feature point and the third feature point, a second midpoint between the first feature point and the fourth feature point, a third midpoint between the second feature point and the fifth feature point, and a fourth midpoint between the second feature point and the sixth feature point; and then divide the first midpoint, the second midpoint, the third midpoint, and the fourth midpoint into two groups, each group consisting of two midpoints corresponding to the same non-target body part.

Therefore, the electronic device may generate a parallelogram-shaped occluded area corresponding to the non-target body part to which midpoints in each group belongs based on a line segment formed by connecting midpoints in each group.

For example, the electronic device generates a parallelogram-shaped occluded area using a line segment formed by connecting midpoints in each group as a beveled edge and an edge of a preset length as a long edge.

After generating the occluded area, the electronic device may cover the target body structure image with the occluded area, and then determine an image area of the target body structure image not covered with the occluded area as the real-time unoccluded area.

Therefore, the electronic device may simulate the occlusion state of the non-body part object, the non-target body structure, and the non-target body part to the three-dimensional decorative effect in a case that the occluding object includes at least one of the non-body part object, the non-target body structure, and the non-target body part, thereby improving the fusion of the added three-dimensional decorative effect with the original image.

Figure 6:
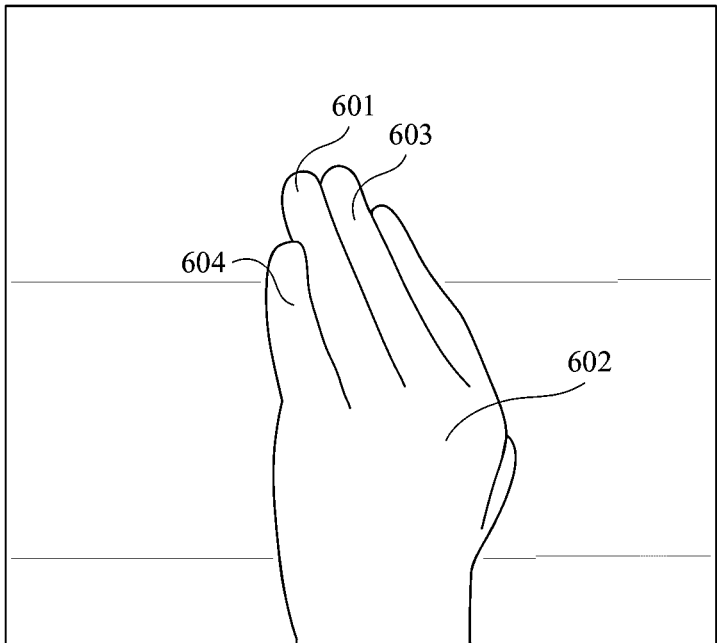
FIG. 6 is a schematic diagram of a renderable image area according to still another embodiment of the present disclosure.
Figure 7:
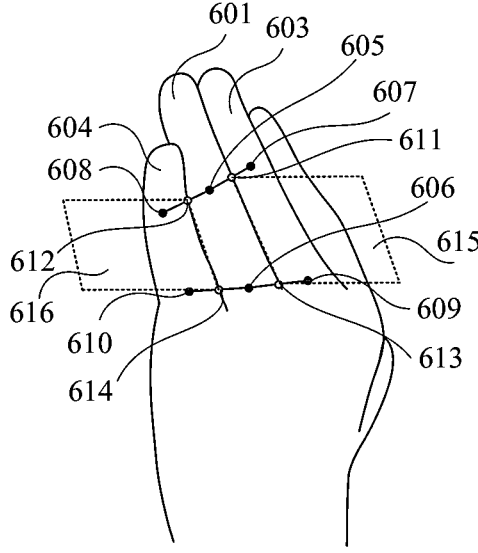
FIG. 7 is a schematic diagram of an occluded area according to an embodiment of the present disclosure.
Figure 8:
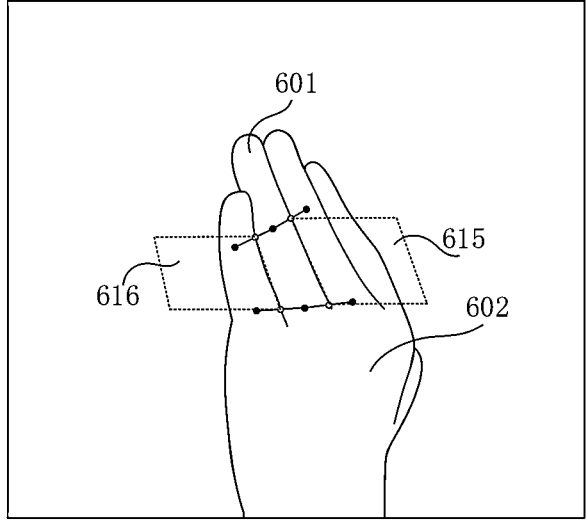
FIG. 8 is a schematic diagram of a renderable image area according to still another embodiment of the present disclosure.

FIG. 6 shows a schematic diagram of a renderable image area according to still another embodiment of the present disclosure. FIG. 7 shows a schematic diagram of an unoccluded area according to an embodiment of the present disclosure. FIG. 8 shows a schematic diagram of a renderable image area according to still another embodiment of the present disclosure.

As shown in FIG. 6, a hand 602 to which a ring finger 601 belongs is not occluded by other body structures. Therefore, the real-time unoccluded area of the ring finger 601 may be determined from the hand 602.

Since the ring finger 601 overlaps a middle finger 603 and a little finger 604, an unoccluded area of ring finger 601 not occluded by the little finger 604 and the middle finger 603 is determined to ultimately determine a real-time unoccluded area of the ring finger 601.

As shown in FIG. 7, a first feature point 605 and a second feature point 606 of the ring finger 601 are the feature points closest to the wearable component wearing position. The two feature points closest to the first feature point 605 include a third feature point 607 of the middle finger 603 and a fourth feature point 608 of the little finger 604. The two feature points closest to the second feature point 606 include a fifth feature point 609 of the middle finger 603 and a sixth feature point 610 of the little finger 604. A midpoint between the first feature point 605 and the third feature point 607 is a first midpoint 611. A midpoint between the first feature point 605 and the fourth feature point 608 is a second midpoint 612. A midpoint between the second feature point 606 and the fifth feature point 609 is a third midpoint 613. A midpoint between the second feature point 606 and the sixth feature point 610 is a fourth midpoint 614. A first occluded area 615 of the parallelogram shape corresponding to the middle finger 603 is generated by using a line segment formed by connecting the first midpoint 611 and the third midpoint 613 as the beveled edge and an edge of a preset length as the long edge. A second occluded area 616 of the parallelogram shape corresponding to the little finger 604 is generated by using a line segment formed by connecting the second finger 612 and the fourth finger 614 as a beveled edge and an edge of a preset length as the long edge.

As shown in FIG. 8, the first occluded area 615 and the second occluded area 616 are superimposed on the hand 602, and thus an area of the ring finger 601 not covered with the first occluded area 615 and the second occluded area 616 is determined as a real-time unoccluded area.

In a case that the wearable component is a ring, since the ring is fully fittingly worn on the ring finger 601, the real-time unoccluded area may form a renderable image area. The to-be-rendered portion of the ring three-dimensional model includes a portion of the ring three-dimensional model within the renderable image area.

Therefore, in the embodiment of the present disclosure, it is possible to simulate the occlusion of other fingers to the three-dimensional decorative effect worn on the ring finger when the fingers are gathered, improving the fusion of the added three-dimensional decorative effect with the original image, and preventing the three-dimensional decorative effect from embedding into fingers adjacent to the ring finger.

In the embodiment of the present disclosure, the decoration three-dimensional model may include a wearable component three-dimensional model and a preset body part model. The electronic device may render a portion of the wearable component three-dimensional model not occluded by the preset body part model based on the real-time posture and the real-time unoccluded area, to obtain the target three-dimensional image.

The preset body part model may be a model preset according to actual application needs to simulate the target body part, and is not limited here. For example, in a case that the target body part is the target head, the preset body part model may be a preset standard head model. For another example, in a case that the target body part is a finger, the preset body part model may be a cylinder or a cuboid, etc.

Specifically, the wearable component three-dimensional model may be worn on the preset body part model in the way as it is worn on the target body part. The preset body part model may scale, rotate, and translate synchronously with the wearable component three-dimensional model based on the real-time posture and feature points of the target body part, in order to determine first depth information of the wearable component three-dimensional model and second depth information of the preset body part model.

The first depth information may include a first depth of each pixel of the wearable component three-dimensional model. The second depth information may include a second depth of each pixel of the preset body part model.

The electronic device compares the first depth of each pixel of the wearable component three-dimensional model with the second depth of the corresponding pixel of the preset body part model, and determines whether the pixel is within the to-be-rendered portion. If the first depth is less than the second depth and the pixel is within the to-be-rendered portion, the pixel of the wearable component three-dimensional model is to be rendered.

Figure 9:
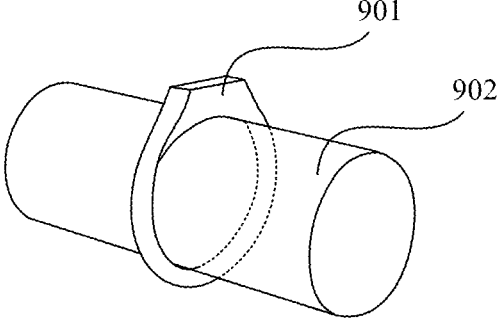
FIG. 9 is a schematic diagram of a preset occlusion model according to an embodiment of the present disclosure.

FIG. 9 shows a schematic diagram of a preset occlusion model according to an embodiment of the present disclosure.

As shown in FIG. 9, the wearable component three-dimensional model may be a ring three-dimensional model 901. The preset body part model may be a cylinder 902. The cylinder 902 is used to simulate the ring finger. The ring three-dimensional model 901 may be worn on the cylinder 902. The electronic device first synchronously scale, rotate, and translate the ring three-dimensional model 901 and the cylinder 902 based on the real-time posture and feature points of the finger wearing the ring; then obtain a first depth of each pixel of the ring three-dimensional model 901 and a second depth of each pixel of the cylinder 902. If the first depth is less than the second depth for corresponding pixels, it indicates that the ring three-dimensional model 901 is closer to the image surface than the cylinder 902 at that pixel. Therefore, the electronic device renders the ring three-dimensional model 901 at that pixel. Otherwise, if the first depth is greater than the second depth for the corresponding pixels, the electronic device does not render the ring three-dimensional model 901 at that pixel.

Therefore, the electronic device may render the wearable component three-dimensional model using the preset body part model, and simulate the occlusion of the target body part to the three-dimensional decorative effect, improving the fusion of the added three-dimensional decorative effect with the original image.

In still another embodiment of the present disclosure, the real-time image may be an image including the target body structure to which the target body part belongs. In order to further avoid the occurrence of goofs, the electronic device may further perform target body part recognition on the real-time image in real time, and only display a composite image when the target body part is recognized.

Specifically, after acquiring a real-time image, the electronic device recognizes whether a target body part is contained in the target body structure in the real-time image, that is, whether a target body part is contained in the real-time image. If it is recognized that the target body part is contained in the real-time image, a composite image may be displayed; otherwise, the real-time image is displayed.

Since the real-time image acquired by the electronic device is likely to change at different times, the electronic device needs to recognize in real-time whether the acquired real-time image contains the target body part, and then determine the image to be displayed based on a recognition result, thereby avoiding the occurrence of goofs.

In still another embodiment of the present disclosure, the target three-dimensional image is obtained by rendering a functional component three-dimensional model based on a target relative position and the real-time posture and rendering a wearable component three-dimensional model based on a target relative position, the real-time posture, and the real-time unoccluded area. The target relative position may be a relative position between the functional component three-dimensional model and the wearable component three-dimensional model in the real-time posture.

The functional component three-dimensional model may be the three-dimensional model of a functional component.

In some embodiments, the functional component may be components with decorative functions, such as a diamond, a bow, or the like.

In other embodiments, the functional component may be components with usable functions, such as a searchlight, antennas, or the like.

Specifically, the functional component and the wearable component may form a complete three-dimensional decorative effect.

In the embodiment of the present disclosure, the electronic device may render the functional component three-dimensional model based on the target relative position and the real-time posture, and render the wearable component three-dimensional model based on the target relative position, the real-time posture, and the real-time unoccluded area, to obtain the target three-dimensional image, and then superpose the target three-dimensional image on the target body part in the real-time image to obtain a composite image.

Furthermore, the decoration three-dimensional model may include the wearable component three-dimensional model and the functional component three-dimensional model. The wearable component three-dimensional model and the functional component three-dimensional model may be arranged based on a preset relative position. The electronic device may synchronously rotate the wearable component three-dimensional model and the functional component three-dimensional model based on the real-time posture of the target body part, to make the model postures of the wearable component three-dimensional model and the functional component three-dimensional model consistent with the real-time posture of the target body part; obtain the target relative position between the functional component three-dimensional model and the wearable component three-dimensional model in the case of being in the posture same as the real-time posture of the target body part; render a portion of the functional component three-dimensional model not occluded by the wearable component three-dimensional model based on the target relative position and the real-time posture, and render a portion of the wearable component three-dimensional model not occluded by the functional component three-dimensional model based on the target relative position, the real-time posture and the real-time unoccluded area, to obtain the target three-dimensional image; and then superpose the target three-dimensional image on the target body part in the real-time image to obtain a composite image.

In some embodiments of the present disclosure, prior to S120 in FIG. 1, the image display method may further include:

determining an upper surface yaw angle of the functional component three-dimensional model based on the real-time posture;

rendering the wearable component three-dimensional model and the functional component three-dimensional model to obtain the target three-dimensional image, in a case that the upper surface yaw angle is within a first preset angle range; and rendering the wearable component three-dimensional model to obtain the target three-dimensional image, in a case that the upper surface yaw angle is within a second preset angle range.

In the embodiment of the present disclosure, the electronic device may determine the model posture of the functional component three-dimensional model based on the real-time posture; then determine the upper surface yaw angle of the functional component three-dimensional model based on the model posture of the functional component three-dimensional model; determine the preset angle range of the upper surface yaw angle; and render the wearable component three-dimensional model and the functional component three-dimensional model in a case that the upper surface yaw angle is within the first preset angle range, to obtain the target three-dimensional image including the wearable component and the functional component, or otherwise render only the wearable component three-dimensional model to obtain the target three-dimensional image including only the wearable component.

Specifically, the electronic device may synchronously scale, rotate, and translate the wearable component three-dimensional model and the functional component three-dimensional model based on the real-time posture, and determine the upper surface yaw angle of an upper surface of the functional component three-dimensional model after scaling, rotating, and translating the wearable component three-dimensional model and the functional component three-dimensional model.

The upper surface may be a surface of the functional component three-dimensional model preset according to actual application needs, and is no limited here. The first preset angle range may be an angle range preset according to actual application needs which allows the upper surface to face the direction visible to the user, and is no limited here. The second preset angle range may be an angle range preset according to actual application needs which allows the upper surface to face away from the user, and is not limited here.

For example, the first preset angle range may be an angle range of [0°, 100°] in both clockwise and counterclockwise directions. The second preset angle range may be an angle range except the first preset angle range.

Figure 10:
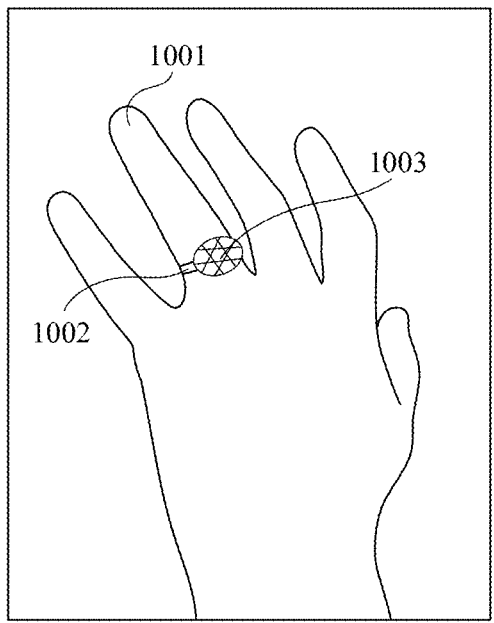
FIG. 10 is a schematic diagram of a composite image according to still another embodiment of the present disclosure.

FIG. 10 shows a schematic diagram of a composite image according to still another embodiment of the present disclosure.

As shown in FIG. 10, the composite image may be an image including a ring finger 1001. The wearable component may be a ring 1002. The functional component may be a diamond 1003. The upper surface yaw angle of the diamond is determined to be within the first preset range based on the posture of the ring finger 1001. That is, the upper surface of the diamond three-dimensional model is determined to face the direction visible to the user. Therefore, the diamond three-dimensional model is rendered based on the real-time posture of the finger, and the ring three-dimensional model is rendered based on the combination of the real-time posture and the real-time unoccluded area of the finger, to obtain the ring 1002 and diamond 1003 in the target three-dimensional image. The target three-dimensional image is superposed and displayed on the ring wearing position of ring finger 1001, so that the user can view the ring effect and diamond effect simultaneously.

Figure 11:
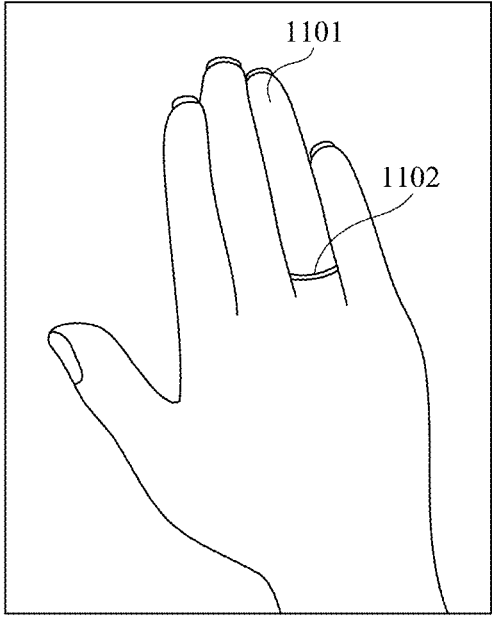
FIG. 11 is a schematic diagram of a composite image according to still another embodiment of the present disclosure.

FIG. 11 shows a schematic diagram of a composite image according to still another embodiment of the present disclosure.

As shown in FIG. 11, the composite image may be an image including the ring finger 1101. The wearable component may be a ring 1102. The functional component may be a diamond. The upper surface yaw angle of the diamond is determined to be within the second preset range based on the posture of the ring finger 1101, That is, the upper surface of the diamond three-dimensional model is determined to face away from the user. Therefore, only the wearable component three-dimensional model is rendered to obtain the three-dimensional ring 1102, and the ring 1102 is superposed and displayed on the ring wearing position of the ring finger 1101, so that the user can only view the ring effect.

Optionally, the electronic device may render the functional component three-dimensional model based on the real-time posture of the target body part and the real-time unoccluded background area, to obtain the functional component in the target three-dimensional image.

Specifically, in a case that the upper surface yaw angle is within the preset angle range, the electronic device may render a portion of the functional component three-dimensional model within the real-time unoccluded background area to obtain the functional component in the target three-dimensional image, which is not be repeated here.

Therefore, the electronic device may further simulate the occlusion of the occluding object to the functional component effect of the three-dimensional decorative effect, improving the fusion of the added three-dimensional decorative effect with the original image.

In summary, with the image display method according to the embodiments of the present disclosure, the occlusion state of the decorative effect may be simulated at the pixel level in various ways, thereby simulating more precise occlusion relationships. The authenticity of the occlusion imposed by any object in the image to the decorative effect can be greatly improved when displaying the decorative effect, improving the fusion of the added three-dimensional decorative effect with the original image, avoiding the occurrence of goofs, enhancing users' sense of immersion and thus enhancing their experience.

An image display apparatus capable of implementing the above image display method is also provided according to an embodiment of the present disclosure. The image display apparatus according to an embodiment of the present disclosure will be explained with reference to FIG. 12 below.

In the embodiment of the present disclosure, the image display apparatus may be an electronic device. The electronic device may include a device with communication function such as a mobile phone, a tablet computer, a desktop computer, a notebook computer, an in-vehicle terminal, a wearable electronic device, an all-in-one machine, and a smart home device, or may be a device simulated with a virtual machine or an emulator.

Figure 12:
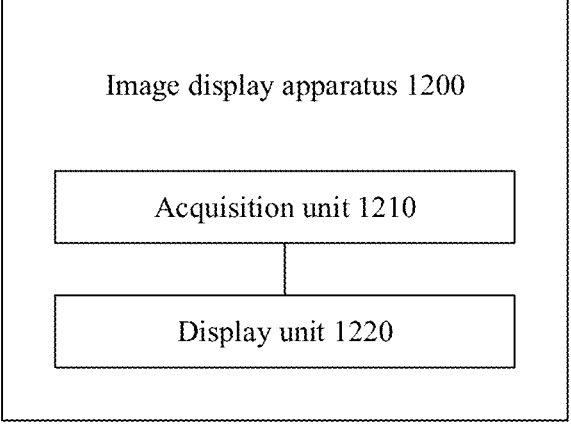
FIG. 12 is a schematic structural diagram of an image display apparatus according to an embodiment of the present disclosure.

FIG. 12 shows a schematic structural diagram of an image display apparatus according to an embodiment of the present disclosure.

As shown in FIG. 12, the image display apparatus 1200 may include an acquisition unit 1210 and a display unit 1220.

The acquisition unit 1210 may be configured to acquire a real-time image of a target body part.

The display unit 1220 may be configured to display a composite image in real-time. The composite image is an image obtained by superimposing a target three-dimensional image on the target body part in the real-time image. The target three-dimensional image is obtained by rendering a wearable component three-dimensional model based on a real-time posture and a real-time unoccluded area of the target body part. The real-time posture and the real-time unoccluded area are determined based on the real-time image.

In the embodiment of the present disclosure, after the real-time image of the target body part is acquired, the composite image obtained by superimposing the target three-dimensional image on the target body part in the real-time image may be displayed in real time. The target three-dimensional image is obtained by rendering the wearable component three-dimensional model based on the real-time posture and the real-time unoccluded area of the target body part. The real-time posture and real-time unoccluded area are directly determined based on the real-time image. Therefore, the goal of automatically adding three-dimensional decorative effect with the wearable component to the real-time image is achieved. By considering the posture and occlusion state of the body part on which the decoration is worn in the process of adding the three-dimensional decorative effect, the fusion of the added three-dimensional decorative effect with the original image can be improved and the occurrence of goofs are avoided, thereby improving the user experience.

In some embodiments of the present disclosure, the real-time posture may include real-time rotational posture of the target body part.

In some embodiments of the present disclosure, the real-time unoccluded area may include an area of the target body part not occluded by an occluding object, and the occluding object may include at least one of a non-body part object, a non-target body structure other than the target body structure to which the target body part belongs, and a non-target body part of the same body part type as the target body part.

In some embodiments of the present disclosure, the target body part may include the target finger. The wearable component three-dimensional model may be a three-dimensional model of a component worn on the target finger. The real-time unoccluded area may include an area of the target finger in the real-time image not occluded by an occluding object. The occluding object may include a non-body part object, a body structure other than the hand to which the target finger belongs and fingers other than the target finger.

In some embodiments of the present disclosure, the target three-dimensional image may be obtained by rendering, based on the real-time posture and the real-time unoccluded area, the portion of the wearable component three-dimensional model not occluded by a preset body part model. The preset body part model may be used to simulate the target body part.

In some embodiments of the present disclosure, the image display apparatus 1200 may further include a first processing unit, a second processing unit, and a first rendering unit.

The first processing unit may be configured to determine first depth information of the wearable component three-dimensional model and second depth information of the preset body part model based on the real-time posture.

The second processing unit may be configured to determine a to-be-rendered portion of the wearable component three-dimensional model based on the real-time unoccluded area.

The first rendering unit may be configured to render a portion of the to-be-rendered portion with a depth less than that of the preset body part model based on the first depth information and the second depth information, to obtain the target three-dimensional image.

In some embodiments of the present disclosure, the real-time unoccluded area may include an area of the target body part not occluded by an occluding object, and the occluding object may include at least one of a non-body part object, a non-target body structure other than the target body structure to which the target body part belongs.

Correspondingly, the second processing unit may include a first processing subunit, a second processing subunit, and a third processing subunit.

The first processing subunit may be configured to perform image segmentation on the real-time image for the target body structure to which the target body part belongs, to obtain a target body structure image.

The second processing subunit may be configured to determine, in the target body structure image, the real-time unoccluded area.

The third processing subunit may be configured to determine the to-be-rendered portion based on the real-time unoccluded area.

In some embodiments of the present disclosure, the occluding object may also include a non-target body part of the same body part type as the target body part.

Correspondingly, the second processing subunit may be further configured to:

perform, on the target body structure image, feature point detection with regard to the target body structure to obtain feature points of the target body structure; determine, based on feature points, an occluded area where the non-target body part occludes the target body part; determine, in the target body structure image, the real-time unoccluded area based on the occluded area.

In some embodiments of the present disclosure, the target three-dimensional image is obtained by rendering a functional component three-dimensional model based on a target relative position and the real-time posture, and rendering a wearable component three-dimensional model based on the target relative position, the real-time posture, and the real-time unoccluded area. The target relative position may be a relative position between the functional component three-dimensional model and the wearable component three-dimensional model in the real-time posture.

In some embodiments of the present disclosure, the image display apparatus 1200 may further include a third processing unit, a second rendering unit, and a third rendering unit.

The third processing unit may be configured to determine an upper surface yaw angle of the functional component three-dimensional model according to the real-time posture.

The second rendering unit may be configured to render the wearable component three-dimensional model and the functional component three-dimensional model to obtain the target three-dimensional image, in a case that the upper surface yaw angle is within a first preset angle range.

The third rendering unit may be configured to render the wearable component three-dimensional model to obtain the target three-dimensional image, in a case that the upper surface yaw angle is within a second preset angle range.

It should be noted that the image display apparatus 1200 shown in FIG. 12 can perform various steps in the method embodiments shown in FIGS. 1 to 11, and implement various processes and effects in the method embodiments shown in FIGS. 1 to 11, which is not repeated here.

An image display device is further provided according to an embodiment of the present disclosure. The image display device may include a processor and a memory. The memory is configured to store executable instructions. The processor is configured to read executable instructions from the memory and execute the executable instructions to implement the image display method in the above embodiments.

Figure 13:
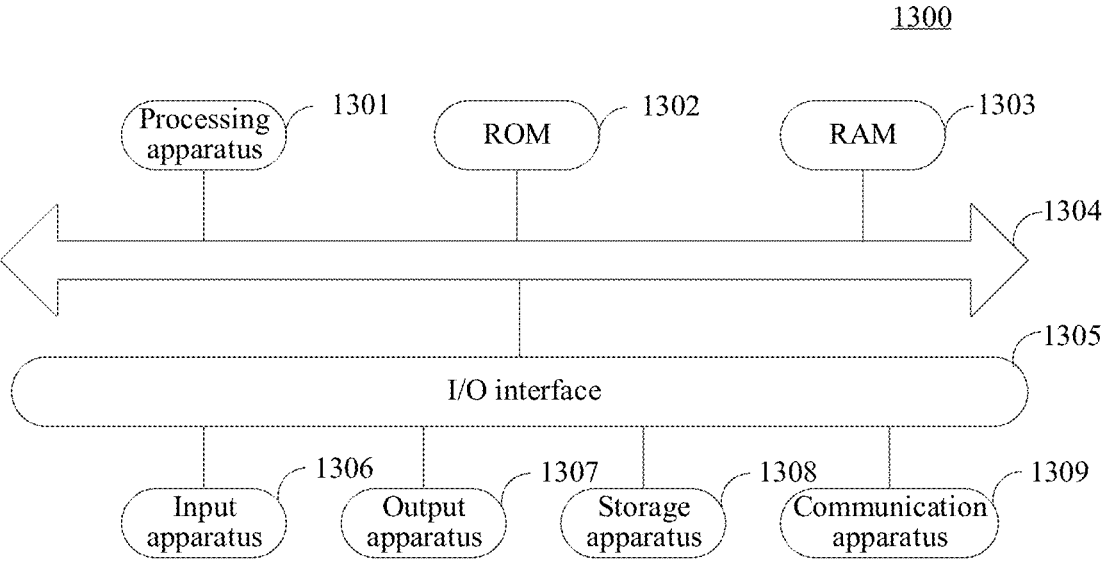
FIG. 13 is a schematic structural diagram of an image display device according to an embodiment of the present disclosure.

FIG. 13 shows a schematic structural diagram of an image display device according to an embodiment of the present disclosure. Reference is made to FIG. 13 below, which shows a schematic structural diagram of an electronic device 1300 suitable for implementing the embodiments of the present disclosure.

The image display device 1300 in the embodiment of the present disclosure may be an electronic device. Specifically, the electronic device may include, but is not limited to, a mobile phone, a laptop, a digital broadcast receiver, a personal digital assistant (PDA), a tablet computer (PAD), a portable multimedia player (PMP), a vehicle-mounted terminal (such as an in-vehicle navigation terminal), a wearable device, and other mobile terminals and fixed terminals such as a digital TV, a desktop computer, and a smart home device.

It should be noted that the image display device 1300 shown in FIG. 13 is only an example and should not impose any limitation on the functionality and scope of use of the embodiment of the present disclosure.

As shown in FIG. 13, the image display device 1300 may include a processing apparatus 1301, such as a central processor or a graphics processor, which may execute various proper operations and processing based on a program stored in a Read Only Memory (ROM) 1302 or a program loaded from a storage apparatus 1308 into a Random Access Memory (RAM) 1303. The RAM 1303 is further configured to store various programs and data demanded by the image display device 1300. The processing apparatus 1301, the ROM 1302 and the RAM 1303 are connected to each other through a bus 1304. An Input/output (I/O) interface 1305 is also connected to the bus 1304.

Generally, the I/O interface 1305 may be connected to: an input apparatus 1306, such as a touch screen, a touch panel, a keyboard, a mouse, a camera, a microphone, an accelerometer, and a gyroscope; an output apparatus 1307, such as a liquid crystal display (LCD), a speaker, and a vibrator; a storage apparatus 1308 such as a magnetic tape and a hard disk; and a communication apparatus 1309. The communication apparatus 1309 enables wireless or wired communication between the image display device 1300 and other devices for data exchanging. Although FIG. 13 shows an image display device 1300 having various apparatus, it should be understood that the illustrated apparatus are not necessarily required to all be implemented or embodied. Alternatively, more or fewer apparatuses may be implemented or included.

A computer-readable storage medium storing a computer program is also provided according to an embodiment of the present disclosure. The computer program, when being executed by a processor, causes the processor to implementing the image display method in the above embodiments.

Particularly, according to the embodiments of the present disclosure, the process described above in conjunction with flowcharts may be implemented as a computer software program.

A computer program product is also provided according to an embodiment of the present disclosure. The computer program product may include a computer program that, when executed by a processor, causes the processor to implementing the image display method in the above embodiments.

For example, a computer program product is provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 1309, or installed from the storage apparatus 1308, or installed from the ROM 1302. When the computer program is executed by the processing apparatus 1301, the functions defined in the method according to the embodiment of the present disclosure are performed.

It should be noted that, the computer readable medium mentioned in the present disclosure may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. More specific examples of computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, RF (radio frequency) and the like, or any proper combination thereof.

In some embodiments, the client and the server can communicate using any currently known or future developed network protocol such as HTTP, and can interconnected with any form or medium of digital data communication (such as, a communication network). Examples of a communication network include a local area network ("LAN"), a wide area network ("WAN"), the Internet Work (for example, the Internet), and a peer-to-peer network (for example, an ad hoc peer-to-peer network), as well as any currently known network or a future developed network.

The above-mentioned computer readable medium may be incorporated in the image display device, or may exist alone without being assembled into the image display device.

The above-mentioned computer-readable medium carries one or more programs. The one or more programs, when executed by the image display device, configure the image display device to:

acquire a real-time image of a target body part; display a composite image in real time, where the composite image is obtained by superposing a target three-dimensional image onto the target body part in the real-time image, the target three-dimensional image is obtained by rendering a wearable component three-dimensional model based on a real-time posture and a real-time unoccluded area of the target body part, and the real-time posture and the real-time unoccluded area are determined based on the real-time image.

In the embodiments of the present disclosure, the computer program code for performing the operations disclosed in the present disclosure may be written in one or more programming languages or combinations thereof. The programming languages include, but not limit to an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block charts in the drawings illustrate the architecture, functions and operations that can be implemented by the system, method and computer program product according to the embodiments of the present disclosure. In this regard, each block in the flowchart or the block diagram may represent a module, a program segment, or a part of code. The module, the program segment, or the part of code includes one or more executable instructions used for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block diagram and/or flowchart and a combination of the blocks in the block diagram and/or flowchart may be implemented by a dedicated hardware-based system that performs specified functions or actions, or may be realized by a combination of dedicated hardware and computer instructions.

The units involved in the embodiments of the present disclosure may be implemented as software, and may also be implemented as hardware. The name of the unit does not constitute a limitation of the unit under any circumstances.

The functions described herein above may be performed, at least in part, by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any suitable combination thereof.

The above description includes merely preferred embodiments of the present disclosure and explanations of technical principles used. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

Furthermore, although the operations are described in a specific order, it should not be understood that these operations are required to be performed in the specific order or performed in a sequential order. Under certain circumstances, multitasking and parallel processing may be advantageous. Similarly, although multiple implementation details are included in the above descriptions, the details should not be interpreted as limitations to the scope of the present disclosure. Some features described in a separate embodiment may be implemented in combination in a separate embodiment. Conversely, the features described in a separate embodiment may be implemented in multiple embodiments individually or in any suitable sub-combination.

Although the subject matter has been described in language specific to structural features and/or logical actions of the method, it should be understood that the subject matter defined in the appended claims are unnecessarily limited to the specific features or actions described above. Instead, the specific features and actions described above are merely exemplary forms of implementing the claims.

The invention claimed is:

1. An image display method, comprising:

acquiring a real-time image of a target body part;

determining an area of the target body part not occluded by an occluding object as a real-time unoccluded area, based on the real-time image of the target body part, wherein the occluding object comprises at least one of a non-body part object, a non-target body structure other than a target body structure to which the target body part belongs, and a non-target body part which is of a body part type same as the target body part;

rendering a wearable component three-dimensional model within the real-time unoccluded area of the target body part according to a real-time posture of the target body part, to obtain a target three-dimensional image; and superposing the target three-dimensional image onto the target body part in the real-time image to obtain a composite image, and displaying the composite image in real time.

2. The method according to claim 1, wherein the target body part comprises a target finger, the wearable component three-dimensional model is a three-dimensional model of a component configured to be worn on the target finger, the real-time unoccluded area comprises an area of the target finger in the real-time image that is not occluded by the occluding object, and the occluding object comprises the non-body part object, the non-target body structure other than a hand to which the target finger belongs and fingers other than the target finger.

3. The method according to claim 1, wherein the target three-dimensional image is obtained by rendering, based on the real-time posture and the real-time unoccluded area, a portion of the wearable component three-dimensional model not occluded by a preset body part model, and the preset body part model is configured to simulate the target body part.

4. The method according to claim 3, wherein before displaying the composite image in real time:

determining first depth information of the wearable component three-dimensional model and second depth information of the preset body part model according to the real-time posture;

determining a to-be-rendered portion of the wearable component three-dimensional model based on the real-time unoccluded area; and rendering, based on the first depth information and the second depth information, a portion of the to-be-rendered portion with a depth less than that of the preset body part model, to obtain the target three-dimensional image.

5. The method according to claim 4, wherein determining the to-be-rendered portion of the wearable component three-dimensional model based on the real-time unoccluded area, comprises:

performing image segmentation on the real-time image for a target body structure to which the target body part belongs, to obtain a target body structure image;

determining, in the target body structure image, the real-time unoccluded area; and determining the to-be-rendered portion based on the real-time unoccluded area.

6. The method according to claim 5, wherein the occluding object further comprises a non-target body part which is of a body part type same as the target body part;

determining, in the target body structure image, the real-time unoccluded area comprises:

performing, on the target body structure image, feature point detection with regard to the target body structure to obtain feature points of the target body structure;

determining, based on feature points, an occluded area where the non-target body part occludes the target body part; and determining, in the target body structure image, the real-time unoccluded area based on the occluded area.

7. The method according to claim 1, wherein the target three-dimensional image is obtained by rendering a functional component three-dimensional model based on a target relative position and the real-time posture and rendering a wearable component three-dimensional model based on a target relative position, the real-time posture, and the real-time unoccluded area, and the target relative position is a relative position between the functional component three-dimensional model and the wearable component three-dimensional model in the real-time posture.

8. The method according to claim 7, wherein before displaying the composite image in real time:

determining an upper surface yaw angle of the functional component three-dimensional model based on the real-time posture;

rendering the wearable component three-dimensional model and the functional component three-dimensional model to obtain the target three-dimensional image, in a case that the upper surface yaw angle is within a first preset angle range; and rendering the wearable component three-dimensional model to obtain the target three-dimensional image, in a case that the upper surface yaw angle is within a second preset angle range.

9. The method according to claim 1, wherein the real-time posture comprises a real-time rotational posture of the target body part.

10. An image display device, comprising:

processor; and memory for storing executable instructions; and wherein the processor is configured to read the executable instructions from the memory and execute the executable instructions to implement:

acquiring a real-time image of a target body part;

determining an area of the target body part not occluded by an occluding object as a real-time unoccluded area, based on the real-time image of the target body part, wherein the occluding object comprises at least one of a non-body part object, a non-target body structure other than a target body structure to which the target body part belongs, and a non-target body part which is of a body part type same as the target body part;

rendering a wearable component three-dimensional model within the real-time unoccluded area of the target body part according to a real-time posture of the target body part, to obtain a target three-dimensional image; and superposing the target three-dimensional image onto the target body part in the real-time image, to obtain a composite image, and displaying the composite image in real time.

11. A non-transitory computer-readable storage medium storing a computer program, wherein the computer program, when executed by a processor, causes the processor to perform:

acquiring a real-time image of a target body part;

determining an area of the target body part not occluded by an occluding object as a real-time unoccluded area, based on the real-time image of the target body part, wherein the occluding object comprises at least one of a non-body part object, a non-target body structure other than a target body structure to which the target body part belongs, and a non-target body part which is of a body part type same as the target body part;

re rendering a wearable component three-dimensional model within the real-time unoccluded area of the target body part according to a real-time posture of the target body part, to obtain a target three-dimensional image; and superposing the target three-dimensional image onto the target body part in the real-time image to obtain a composite image, and displaying the composite image in real time.

12. The image display device according to claim 10, wherein the target body part comprises a target finger, the wearable component three-dimensional model is a three-dimensional model of a component configured to be worn on the target finger, the real-time unoccluded area comprises an area of the target finger in the real-time image that is not occluded by the occluding object, and the occluding object comprises the non-body part object, the non-target body structure other than a hand to which the target finger belongs and fingers other than the target finger.

13. The image display device according to claim 10, wherein the target three-dimensional image is obtained by rendering, based on the real-time posture and the real-time unoccluded area, a portion of the wearable component three-dimensional model not occluded by a preset body part model, and the preset body part model is configured to simulate the target body part.

14. The image display device according to claim 13, wherein the processor is further configured to perform:

determining first depth information of the wearable component three-dimensional model and second depth information of the preset body part model according to the real-time posture;

determining a to-be-rendered portion of the wearable component three-dimensional model based on the real-time unoccluded area; and rendering, based on the first depth information and the second depth information, a portion of the to-be-rendered portion with a depth less than that of the preset body part model, to obtain the target three-dimensional image.

15. The image display device according to claim 14, wherein the processor is further configured to perform:

performing image segmentation on the real-time image for a target body structure to which the target body part belongs, to obtain a target body structure image;

determining, in the target body structure image, the real-time unoccluded area; and determining the to-be-rendered portion based on the real-time unoccluded area.

16. The image display device according to claim 15, wherein the occluding object further comprises a non-target body part which is of a body part type same as the target body part;

wherein the processor is further configured to perform:

performing, on the target body structure image, feature point detection with regard to the target body structure to obtain feature points of the target body structure;

determining, based on feature points, an occluded area where the non-target body part occludes the target body part; and determining, in the target body structure image, the real-time unoccluded area based on the occluded area.

17. The image display device according to claim 10, wherein the target three-dimensional image is obtained by rendering a functional component three-dimensional model based on a target relative position and the real-time posture and rendering a wearable component three-dimensional model based on a target relative position, the real-time posture, and the real-time unoccluded area, and the target relative position is a relative position between the functional component three-dimensional model and the wearable component three-dimensional model in the real-time posture.

18. The image display device according to claim 17, wherein the processor is further configured to perform:

determining an upper surface yaw angle of the functional component three-dimensional model based on the real-time posture;

rendering the wearable component three-dimensional model and the functional component three-dimensional model to obtain the target three-dimensional image, in a case that the upper surface yaw angle is within a first preset angle range; and rendering the wearable component three-dimensional model to obtain the target three-dimensional image, in a case that the upper surface yaw angle is within a second preset angle range.

* * * * *